United States Patent [19]
Kikuchi et al.

[11] 4,408,286
[45] Oct. 4, 1983

[54] METHOD AND APPARATUS OF ROBOT TEACHING

[75] Inventors: Hiroshi Kikuchi, Hiratsuka; Koichi Sugimoto, Yokohama, both of Japan

[73] Assignee: Hitachi, Ltd., Tokyo, Japan

[21] Appl. No.: 215,333

[22] Filed: Dec. 11, 1980

[30] Foreign Application Priority Data

Dec. 14, 1979 [JP] Japan .................... 54-161557

[51] Int. Cl.³ .............................................. G05B 19/42
[52] U.S. Cl. .................................... 364/513; 318/568; 364/191
[58] Field of Search ............... 364/513, 474, 478, 191, 364/192, 193; 318/568; 414/719, 730, 4, 5

[56] References Cited

U.S. PATENT DOCUMENTS

| | | |
|---|---|---|
| 3,920,972 | 11/1975 | Corwin, Jr. et al. ............ 364/513 X |
| 4,187,454 | 2/1980 | Ito et al. ......................... 364/513 X |
| 4,283,764 | 8/1981 | Crum et al. ...................... 364/513 |
| 4,298,308 | 11/1981 | Richter ............................. 364/513 X |
| 4,300,198 | 11/1981 | Davini .............................. 364/513 |

*Primary Examiner*—Joseph F. Ruggiero
*Attorney, Agent, or Firm*—Antonelli, Terry & Wands

[57] ABSTRACT

A method for teaching an operation of a robot to the robot and its apparatus are disclosed in which a force sensor capable of sensing three-directional force components and three-directional moment components at the maximum is provided at the wrist of the robot. An operator for teaching the robot applies the force or the moment to the force sensor. The data representing the force or the moment is taken out from the sensor to drive the robot in the force or moment direction and the robot drive data thus collected are loaded into a memory device of the robot control unit. A plurality of directional parameters representing a position of the front end of the arm of the robot and a plurality of directional parameters representing a posture of the wrist define a state of the robot. Therefore, a plurality of directional components of force obtained from the force sensor are made correspond to the parameters representing the robot position and a plurality of directional parameters of the moment are made correspond to the parameters representing a posture of the wrist.

15 Claims, 16 Drawing Figures

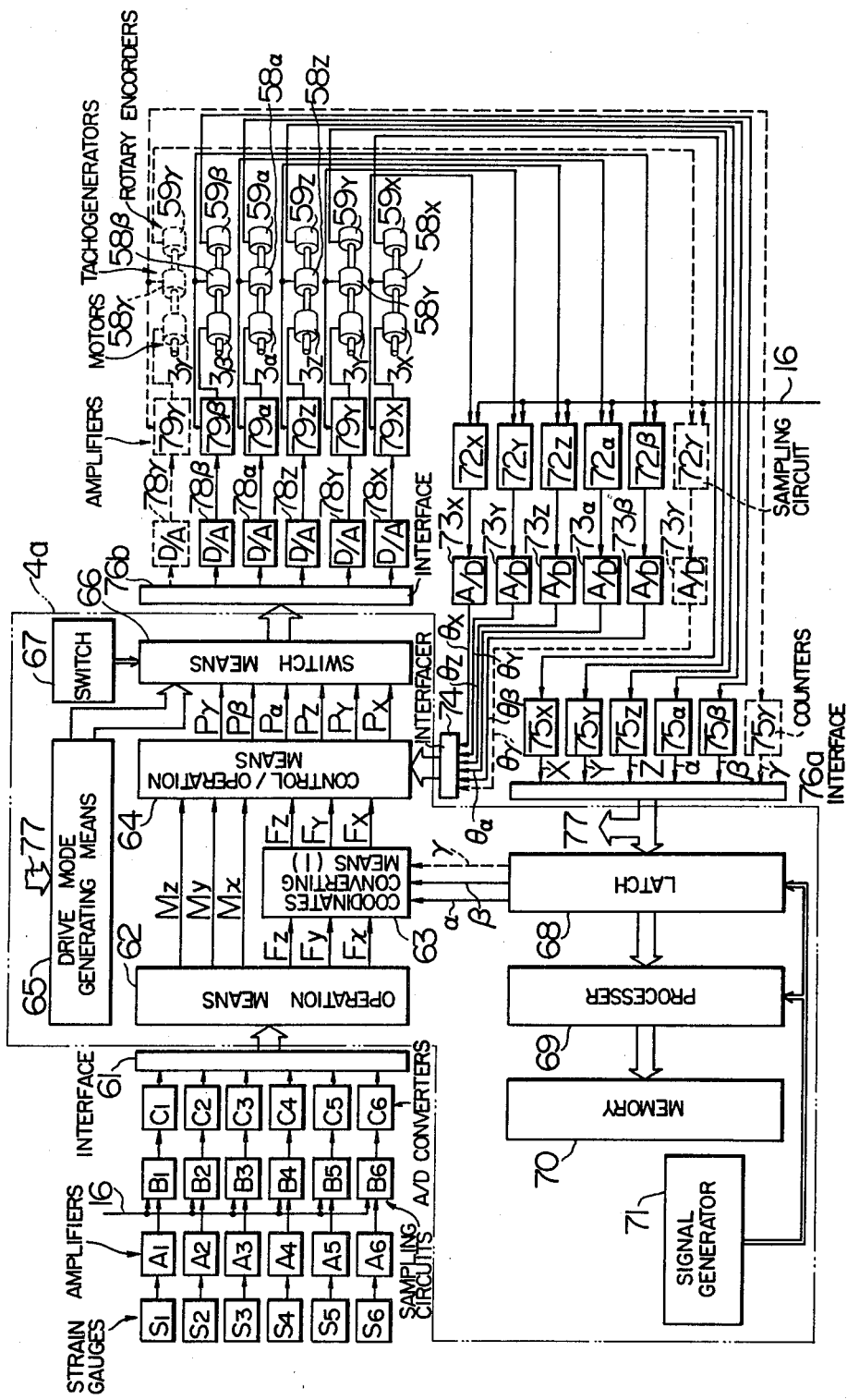

METHOD AND APPARATUS OF ROBOT TEACHING

BACKGROUND OF THE INVENTION

The present invention relates to a method and apparatus for tracking an operation of a robot to the robot.

A conventional robot-operation teaching method, predominantly employed, is categorized into two methods. In one of the teaching methods, an operator to teach the robot its operation operates a remote operating device connected to a robot control unit to guide a robot along an operation route of the robot operation and to store the robot-guiding data into the robot control unit. In another method, a driven section of the robot is detached from a drive section for driving the driven section. The operator directly holds a wrist of the robot to guide the robot in accordance with its operation route, and then to store the robot-guiding data into the robot control unit. The former method has poor operability in guiding the robot in desired directions and needs a high degree as skill for effecting such a manual operation.

In the latter method, the operator, in guiding the robot for the robot guiding data storage, supports the dead weight of the robot and needs to apply a force exceeding the friction at the sliding portion or the rotating portion of the robot. In this respect, the operator is subjected to a superfluous and undesirable work load. Particularly in the robot using an electric-driven actuator, it is necessary to separate the driven section from the drive section. This makes the robot system complicated.

SUMMARY OF THE INVENTION

Accordingly, an object of the present invention is to provide a method to teach a robot an operation of the robot which during the course of the teaching operation, alleviates the work load imposed on the robot-operation teacher to remarkably improve the operability in the robot teaching operation, and the invention also relates to an apparatus for executing the robot-operation teaching method.

To achieve the above-object, in accordance with the present invention, a force sensor capable of sensing the physical force components or moment components in three directions, at most, is mounted to a wrist part of a robot. A robot instructor applies physical force or moment to the force sensor. The data representing the physical force or the moment is obtained from the force sensor. On the basis of the data obtained, the robot is operated in the physical force or the moment direction or directions. Through this operation, the robot driving data is stored into a memory in a robot control unit.

A state of the robot is defined by directional parameters respectively the position of a front and of an arm of the robot and posture parameters representing the posture of the wrist of the robot. Based on this fact, the physical force components derived from the sensor are made to correspond to the parameters representative of the position of the arm-front end and the moment components to the parameters representative of the wrist posture.

The present invention will better be understood when reading the following description in conjunction with the accompanying drawings.

BRIEF DESCRIPTION OF THE DRAWINGS

FIG. 11 is a block diagram which shows one embodiment of direct teaching apparatus for a rectangular coodinates type robot.

DESCRIPTION OF THE PREFERRED EMBODIMENTS

Figure 1:
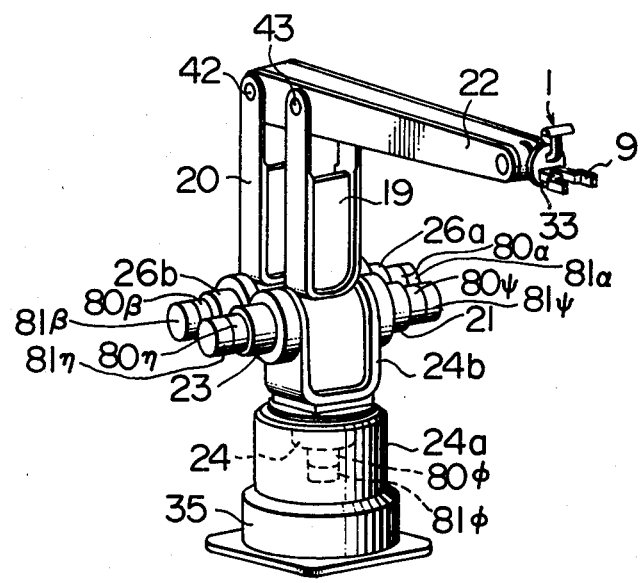
FIG. 1 perspectively illustrates an external view of a multi-joint type robot according to the present invention.
Figure 2:
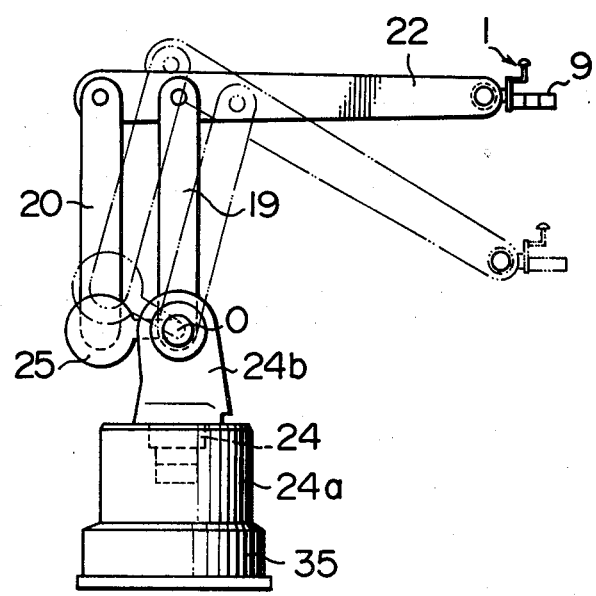
FIG. 2 is a front view of the multi-joint type robot shown in FIG. 1.

The present invention will be described in detail based on the embodiment illustrated in the drawings. FIGS. 1 to 7 illustrate the relation between an industrial multi-joint (articulated) type robot and a force sensor according to the present invention. In FIG. 1, a turntable 24a mounted on a base 35 is rotatable about an axis of the base 35. The turntable is coupled with an output shaft of a turntable drive motor 24 fixedly mounted within the base 35 coaxially with the axis through a reduction means. A first upper arm 19, supported by a U-shaped frame 24b mounted to the upper surface of the turntable 24a and swingable about the center O, is fixed through a reduction means (not shown) to the output shaft of a first upper drive motor 21 of which the shaft is provided at the center O of one of the side walls of the frame 24b. A lever 25, supported by the U-shaped frame 24b on the upper surface of the turntable 24a and swingable about the center O of the frame 24b, is fixed to the output shaft of the front arm drive motor of which the shaft is provided at the center O on the other side-wall of the frame 24b. A second arm 20 is rotatably mounted at one end to the swing end of the lever 25 by means of a bearing 44, as shown in FIG. 4. A front arm 22 is provided at the front end with a wrist 33 having a chuck 9 for holding a part or parts and a force sensor 1. The rear end of the front arm 22 is rotatably coupled with the other end of the upper arm 20 by means of a shaft 42.

A portion of the arm 22 closer to the rear end thereof is also rotatably coupled with the swing end of the first upper arm 19 by means of a shaft 43. The first upper arm 19 and the second upper arm 20 are arranged in parallel. The lever 25 and the front arm 22 are also arranged in parallel with each other. The first and second upper arms 19 and 20, the lever 25 and the front arm 22 cooperate to form a four-joint-parallel-link mechanism.

The drive rotating movement of the first upper arm drive motor 21 is speed-reduced by the reduction means to directly swing the first upper arm 19. The drive rotating movement of the lever drive motor 23 is speed-reduced by the reduction means to directly swing the lever 25. The swing of the lever 25, applied through the upper arm 20 to the front arm 22, swings the front arm 22 at the same angle as that of the swing of the lever 25.

Figure 3:
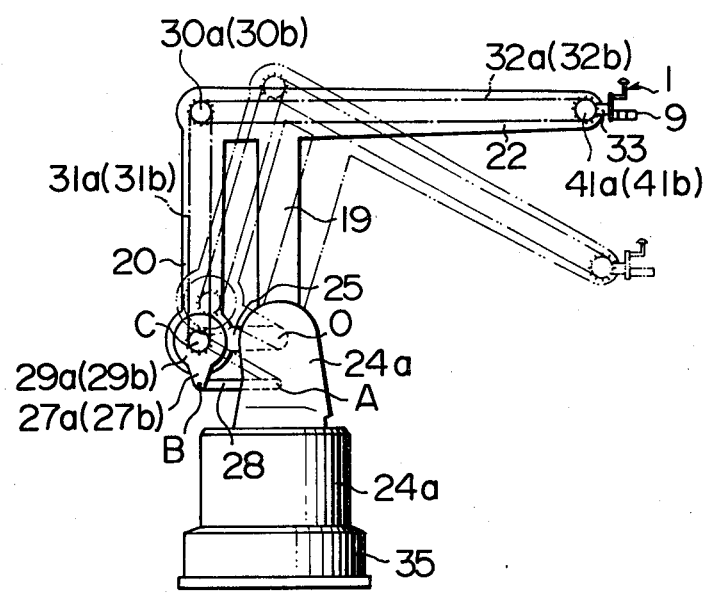
FIG. 3 schematically illustrates a wrist-drive mechanism of the robot shown in FIG. 2.
Figure 4:
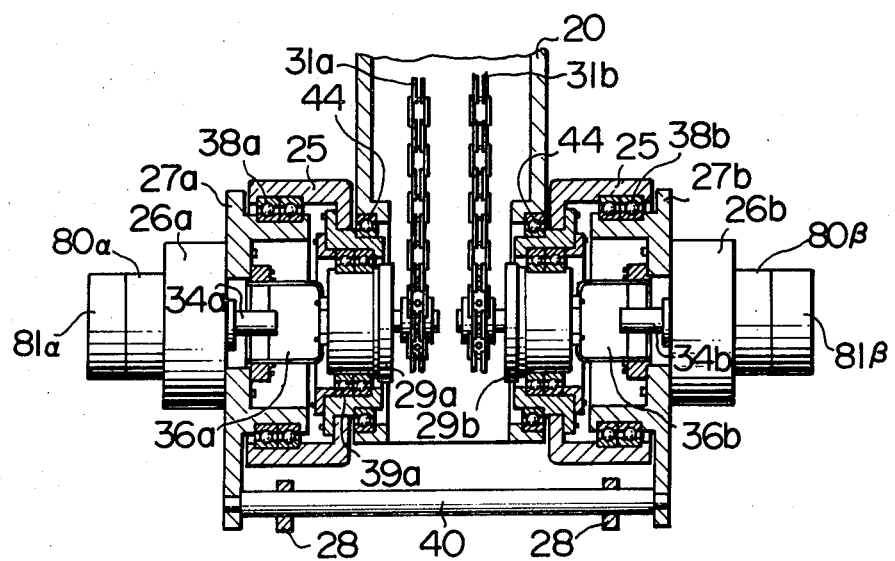
FIG. 4 is a cross sectional view of a joint-portion of a lever and a second upper arm in the wrist-drive mechanism shown in FIG. 3.

FIGS. 3 and 4 will illustrate a mechanism to drive the wrist 33. Wrist drive motors 26a and 26b, respectively, are fixed to members 27a and 27b which are rotatably supported by bearings 38a and 38b to the swing end of the lever 25 at coupling point where the lever 25 is rotatably coupled with the second upper arm 20. Links 28 are each rotatably coupled at one end with a point A of the turntable 24a and at the other end with the swing ends B (a bar 40 coupling the member 27a with the member 27b) of the members 27a and 27b, respectively. A parallel link mechanism is formed by arranging the lever 25 and the link 28 in parallel and the $\overline{AO}$ of the turntable 24a and the members 27a and 27b similarly in parallel. A pair of discs 29a and 29b coupled through reduction means 36a and 36b with the wrist drive motors 26a and 26b, respectively, are rotatably coupled with the swing end of the lever 25 by means of bearings 39a and 39b. Discs 30a and 30b are rotatably coupled with a portion (coaxial with the shaft 42) where the second upper arm 20 is rotatably coupled with the front arm 22. Links 31a and 31b, respectively, link the discs 29a and 29b with the discs 30a and 30b by means of the parallel link mechanism, and links 32a, 32b, respectively, link the discs 30a and 30b with the discs 41a and 41b by means of the parallel link mechanism.

Figure 5A:
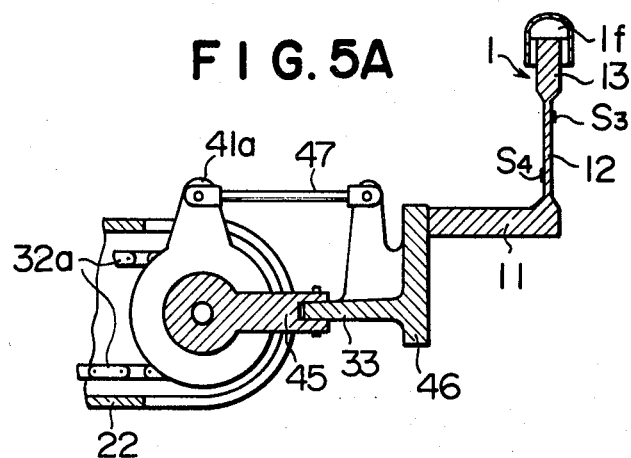
FIG. 5A shows a cross sectional view of a first wrist mechanism shown in FIG. 1.
Figure 5B:
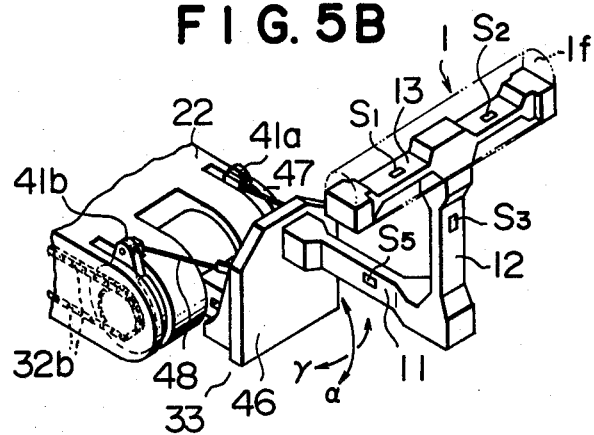
FIG. 5B shows a perspective view of the first wrist mechanism in FIG. 5A.

Two systems of the drive mechanisms, designated by the same numerals with suffixes a and b, are provided to move the wrist 33 as in the directions of the arrows shown in FIG. 5B or back and forth (in a direction from the reverse to the obverse side of the paper and vice versa) or to rotate the wrist about the axis thereof.

The rotations of the output shafts 34a and 34b of the wrist drive motors 26a and 26b are transformed through the reduction means 36a and 36b into the rotations of the discs 29a and 29b which in turn drive the links 31a and 31b, respectively. Through the drives of the links 31a and 31b, the wrist 33 is swung vertically (in the arrow direction) or back and forth, or rotated about the axis. The stator side members 27a and 27b of the wrist drive motors 26a and 26b are rotatably mounted around the swing end C of the lever 25 through the bearings 38a and 38b, respectively. The swing ends B of the members 27a and 27b are mounted on the upper portion A of the turntable 24a in a swing manner, through the bar 40 and the link 28. The point O on the turntable 24a, and the points A, B and C are arranged in a parallelogram fashion. Lines $\overline{OA}$, $\overline{AB}$, $\overline{BC}$ and $\overline{CO}$ form a 4-joint parallel link mechanism with a stationary joint $\overline{OA}$. Two parts of the discs 29a and 29b, and 30a and 30b, and a pair of the links 31a and 31b cooperate to form a 4-joint parallel link mechanism. Two pairs of the discs 30a and 30b, and 41a and 41b, and a pair of the links 32a and 32b form a 4-joint parallel link mechanism. With such an arrangement, if the upper arm 20 is moved and the wrist drive motors 26a and 26b are moved in their positions, the rotational positions of the discs 29a, 29b, 30a, 30b, 41a and 41b are kept constant with respect to the stationary joint $\overline{OA}$ to maintain a posture of the wrist 33, unless the wrist drive motors 26a and 26b are driven to rotate the discs 29a and 29b.

Figure 6A:
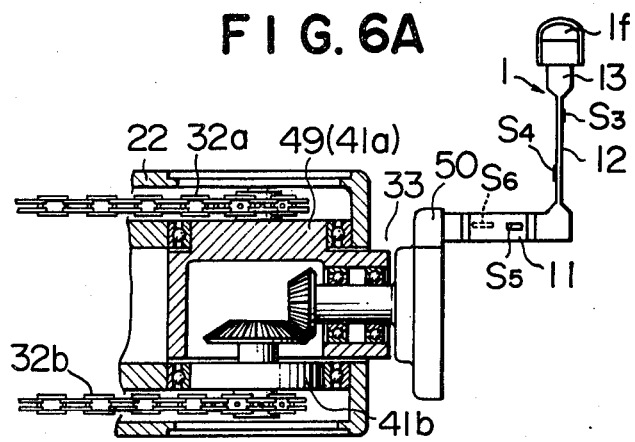
FIG. 6A shows a cross sectional view of a second wrist-drive mechanism attached to the front end of the front arm shown in FIG. 1.

Regarding the wrist 33, there are two embodiments shown, that is, where a mechanism as shown in FIGS. 5A, B is attached to the front end of the front arm 22 and that where a mechanism as shown in FIGS. 6A, B is attached to the same. In the mechanism shown in FIGS. 5A, B the wrist 33 is comprised of a lever 45 which is mounted to rotate about an axis about which the discs 41a and 41b rotate and a lever 46 coupled with the swing end of the lever 45, which swings in a direction orthogonal to the swing direction of the lever 45. The upper ends of the lever 46 and the disc 41a are coupled with one another by means of a lever 47. With this construction, when the discs 41a and 41b are rotated through the same angle by driving the wrist drive motors 26a and 26b through the same rotational angle, the wrist 33 is directed in a direction $\alpha$ by the rotational angle, as shown in FIG. 5B. When the wrist drive motors 26a and 26b are driven in opposite directions by the same angle to rotate the discs 41a and 41b by the same rotational angle in opposite directions, the wrist 33 is swung in a direction $\gamma$ shown in FIG. 5B.

Figure 6B:
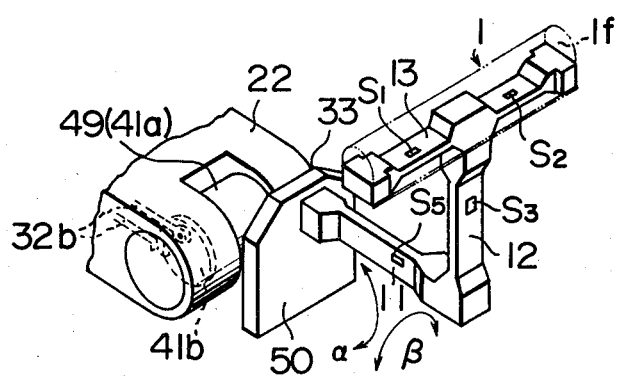
FIG. 6B shows a perspective view of the second wrist-drive mechanism in FIG. 6A.

In the mechanism shown in FIG. 6, the wrist 33 is comprised of a cylinder 49, that is integral with the disc 41a and rotatably supported by a bearing 51, and a member 50 with an bevel gear fixed thereto in mesh with an bevel gear fixed to the rear end of the disc 41b. When only the wrist drive motor 26a is driven to rotate, the disc 41a (cylinder 49) rotates by the same rotational angle as the motor 26a is rotated, and the wrist 33 is directed in the direction $\alpha$ in FIG. 6B. When only the wrist drive motor 26b is rotated, the disc 41b rotates by the same amount to direct the wrist in a direction $\beta$ in FIG. 6B, through the bevel gears.

Figure 7:
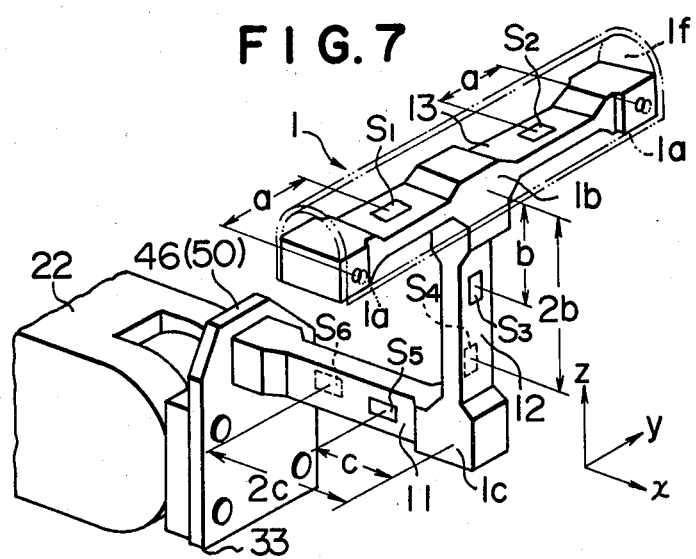
FIG. 7 shows a perspective view of a force sensor for executing the robot-operation teaching method according to the invention.

The wrist 33 constructed as mentioned above is provided with a force sensor 1 having handle 1f for manual and direct operation as shown in FIG. 7 to be described below.

The sensor 1 is comprised of an x-axis beam 11 with strain gauges $S_5$ and $S_6$ adhering thereto, which is fixed to mounting bases 46 and 50 at the front end of the arm 22, extending in an x-axis but providing a distortion in a y-direction, a z-axis beam 12 with strain gauges $S_3$ and $S_4$ attached thereto which extends from the front end of the x-axis beam 11 in the z-axis direction but provides a distortion in a x-direction and a y-axis beam 13 which extends from the top end of the z-axis beam 12 toward both sides in the y-axis direction but provides a distortion in the z-axis direction, and which is provided at both ends with operation points 1a to which a handle 1f (indicated by a two-dot chain line in FIG. 7) for manual operation is mounted.

Those strain gauge $S_1$ to $S_6$ produce output signals having the following relations $$S_1 = (M_x/2) \cdot k - F_z \cdot a \cdot k \qquad (1)$$

$$S_2 = -(M_x/2) \cdot k - F_z \cdot a \cdot k \qquad (2)$$

$$S_3 = -M_y \cdot k - F_x \cdot b \cdot k \qquad (3)$$

$$S_4 = M_y k + F_x \cdot 2b \cdot k \quad (4)$$

$$S_5 = M_z k + F_y c k \quad (5)$$

$$S_6 = -M_z k - F_y \cdot 2c k \quad (6)$$

In the above equations, $F_x$ is a force acting in the x-axis direction, $F_y$ a force in the y-axis direction, $F_z$ a z-axis direction, $M_x$ a moment acting around the x-axis, $M_y$ a moment acting around the y-axis, $M_z$ a moment acting around the z-axis, a a distance from a point 1a of action to a strain gauge $S_1$ or $S_2$, b a distance from a point 1b of action to the strain gauge $S_3$, 2b a distance from a point 1b of action to the strain gauge $S_4$, c a distance from a point 1c of action to the strain gauge $S_5$, and 2c a distance from a point 1c of action to the strain gauge $S_6$.

From the equations (1), (2), (3), (4), (5) and (6), the forces $F_x$, $F_y$ and $F_z$, and the moment $M_x$, $M_y$ and $M_z$ are obtained by the following equations (7) to (12).

$$F_x = (S_3 + S_4)/k \cdot b \quad (7)$$

$$F_y = -(S_5 + S_6)/k \cdot c \quad (8)$$

$$F_z = -(S_1 + S_2)/k \cdot a \quad (9)$$

$$M_x = (S_1 - S_2)/k \quad (10)$$

$$M_y = -(2S_3 + S_4)/k \quad (11)$$

$$M_z = (2S_5 + S_6)/k \quad (12)$$

Figure 13:
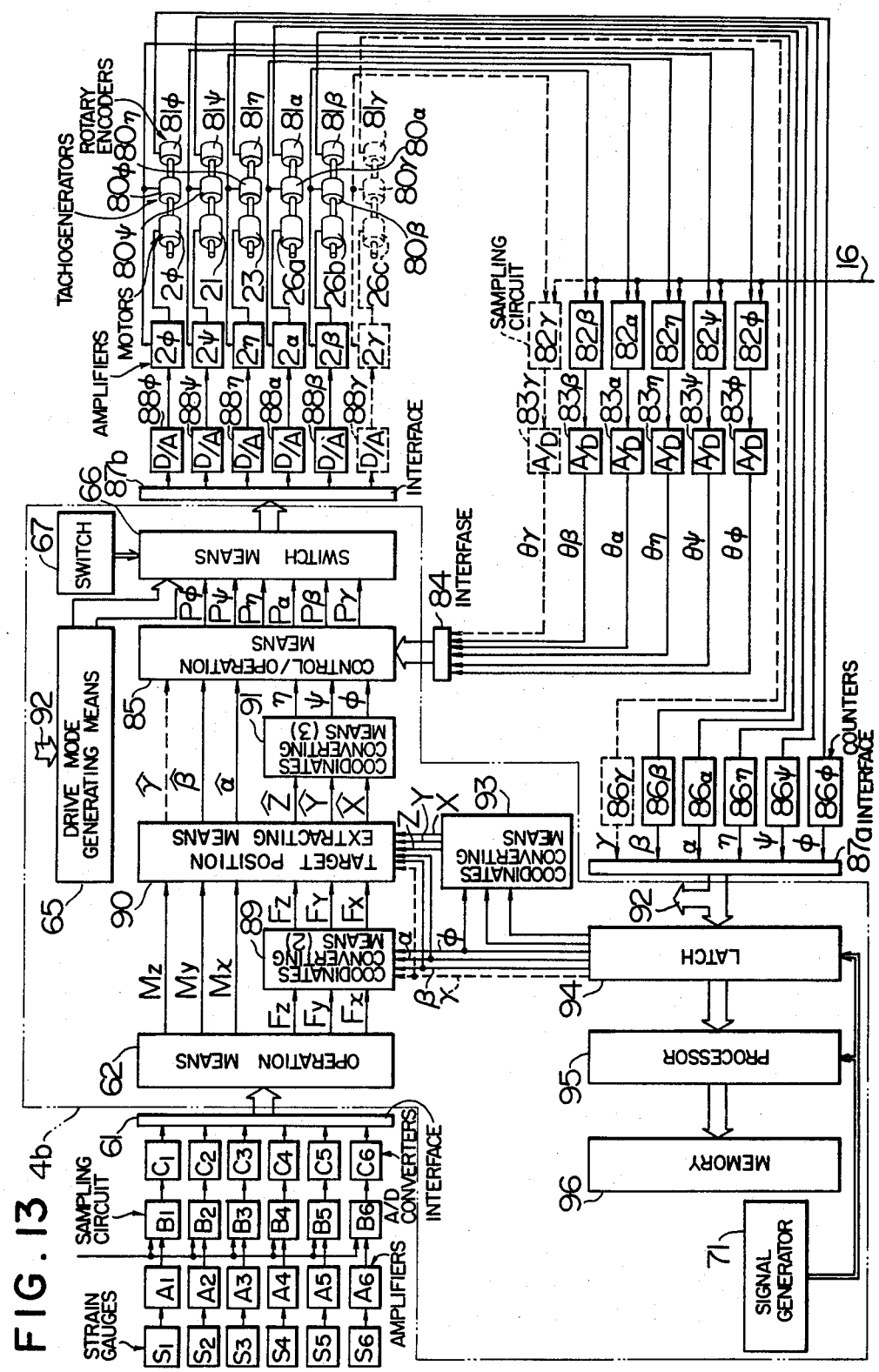
FIG. 13 is a block diagram which shows one embodiment of direct teaching apparatus for a joint type robot.

In a circuit scheme for solving the above equations as illustrated in FIG. 11 or FIG. 13, the output signals from the strain gauges $S_1$ to $S_6$ are amplified by amplifiers $A_1$ to $A_6$, and sampled at given time intervals in sampling circuits $B_1$ to $B_6$ by using a sampling signal 16. The sampled signals are converted into digital signals by A/D converters $C_1$ to $C_6$, which are in turn computed in accordance with the equations (7) to (12) by an operation circuit 62 of a microcomputer 4a or 4b through an interface circuit 61 to produce the x-direction component of force $F_x$, the y-direction component of force $F_y$, the z-direction component of force $F_z$, the moment component $M_x$ about the x-axis, the moment component $M_y$ about the y-axis, and the moment component $M_z$ about the z-axis. In operation, an operator for teaching the operation of the robot to the robot per se applies a force and moment in a desired direction in which the robot is to be moved by gripping the operating handle 1f. Here, three force components $F_x$, $F_y$ and $F_z$ are made to correspond to movement amounts in the x-, y- and z-directions. Three moment components $M_x$, $M_y$ and $M_z$ are made to correspond to a twist amount about the x-axis, a swing amount about the y-axis, and a swing amount about the z-axis. These relationships are well suited for utilization by a human being.

The respective drive means are driven so that the front end of the arm of the robot is moved in the direction of force and the wrist posture is changed in the direction of moment.

Figure 8:
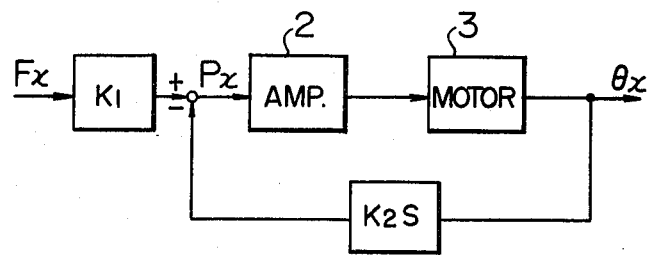
FIGS. 8 to 10 show block diagrams of a control system using signals representative of the force or the moment derived from the force sensor shown in FIG. 7.
Figure 9:
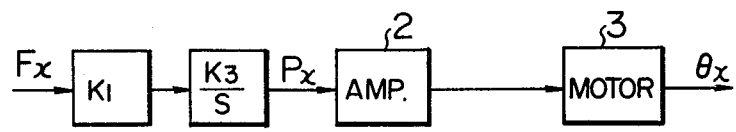
Figure 10:
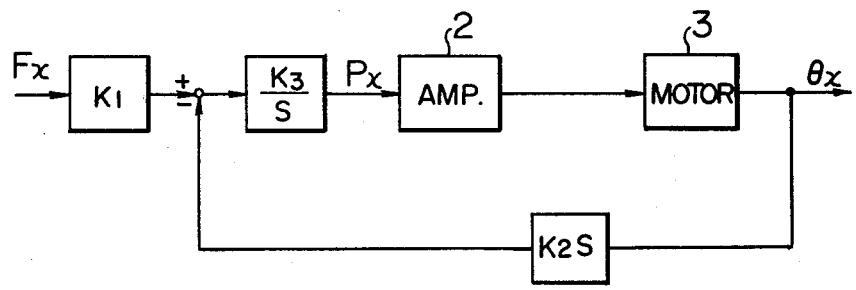

There are three ways to produce a command to drive the motor, as shown in FIGS. 8 to 10. FIGS. 8 to 10 are block diagrams to drive a motor 3 by the force $F_x$ sensed by the force sensor 1 and to move the front end of the arm in the x-direction. Here, $\theta_x$ designates a rotational angle of the motor 3.

In an example shown in FIG. 8, an angular velocity $\dot{\theta}_x$ of the rotational angle $\theta_x$ is subtracted from a product of the force $F_x$, for example, and a constant $K_1$. The result of the subtraction is used as a command and is amplified by a motor drive amplifier 2. The amplified command is applied to the motor 3 to give a damping effect to the motor.

In another example shown in FIG. 9, the product of the force $F_x$ and a constant $K_1$ is integrated and the integrated result is used as a command. The command is amplified by the motor drive amplifier 2 to provide a pseudo inertia effect of the arm.

In an example shown in FIG. 10, an angular velocity $\dot{\theta}_x$ of the rotational angle $\theta_x$ is subtracted from the product of the force $F_x$ and the constant $K_1$, and the result of the subtraction is integrated. The integrated result is amplified as a command to the motor drive amplifier 2 and applied to the motor 3. The damping effect produced by the example of FIG. 10 is superior to that by the FIG. 9 example. When the operator detaches his hand from the operating sections 1a, the arm continues its movement with the motor in FIG. 9 example. On the other hand, in FIG. 10 example, the arm gradually stops with the motor. Therefore, the FIG. 10 example executes the robot-operation teaching work more safely than the FIG. 9 example.

Although the above-mentioned block diagrams are for the force $F_x$, they are correspondingly applicable to the other mentioned forces and moments.

FIG. 11 shows a block diagram for executing the operations in FIGS. 8 to 10 by using a computer 4. The control system employed is of the discrete control type. Operation formulae performed by the computer 4 when the control system is the one of FIG. 10 and the rectangular coordinates type robot is used of which the arm is moved on the rectangular coordinates. In the following equations (13), (14), (15), (16), (17) and (18), T is a sample time.

$$P_x = K_{3x} \sum_{i=0}^{n} \{K_{1x} F_x(iT) - K_{2x} \dot{\theta}_x(iT)\} \quad (13)$$

$$P_y = K_{3y} \sum_{i=0}^{n} \{K_{1y} F_y(iT) - K_{2y} \dot{\theta}_y(iT)\} \quad (14)$$

$$P_z = K_{3z} \sum_{i=0}^{n} \{K_{1z} F_z(iT) - K_{2z} \dot{\theta}_z(iT)\} \quad (15)$$

$$P_\alpha = K_{3\alpha} \sum_{i=0}^{n} \{K_{1\alpha} M_x(iT) - K_{2\alpha} \dot{\theta}_\alpha(iT)\} \quad (16)$$

$$P_\beta = K_{3\beta} \sum_{i=0}^{n} \{K_{1\beta} M_y(iT) - K_{2\beta} \dot{\theta}_\beta(iT)\} \quad (17)$$

$$P_\gamma = K_{3\gamma} \sum_{i=0}^{n} \{K_{1\gamma} M_z(iT) - K_{2\gamma} \dot{\theta}_\gamma(iT)\} \quad (18)$$

where $P_x$ is an output signal to the motor for driving the arm in the x-axis, $P_y$ is an output signal to the motor for driving the arm in the y-direction, $P_z$ is an output signal to the motor for driving the arm in the z-direction, $P_\alpha$ an output signal to the motor for rotating the wrist about the x-axis, $P_\beta$ an output signal to the motor for rotating the wrist about the y-axis, $P_\gamma$ an output signal for rotating the wrist about the z-axis, $K_{1j}$, $K_{2j}$, $K_{3j}$ (j = x, y, z, $\alpha$, $\beta$, $\gamma$) each is a constant, and $\dot{\theta}_j$ (j = x, y, z, $\alpha$, $\beta$, $\gamma$) a motor speed of the motor.

Figure 12:
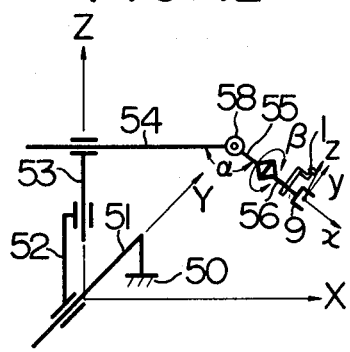
FIG. 12 is a diagram showing the fundamentals of the structure of the rectangular coodinates type robot with 5-directional moments.

A schematic circuit diagram of a rectangular coordinates type robot is shown in FIG. 12. In the rectangular coordinates type robot, a Y-axis arm 52 is slidably supported by a shaft 51 based on a base 50 and is driven in the Y-direction along the shaft 51 by means of a motor 3Y through a lead screw and the like. A Z-axis arm 53 is slidably supported by the Y-axis arm 52 and driven in the Z-direction therealong by means of a motor 3x through a lead screw and the like. A wrist upper part 55 is rotatably coupled with the distal end of the X-axis arm 54 and is rotated about a shaft 58 arranged in the y-direction by a motor 3γ. A wrist lower part 56 is rotatably coupled with the wrist upper part 55 and is rotated about a longitudinally extending x-axis of the wrist by a motor 3β. Thus, the rectangular coordinates type robot has five-directional movements. The wrist lower part 56, provided with the force sensor 1, forms a finger part 9 for attachment of tools or chuck. The finger part 9 has any posture. In the coordinates system applied to the finger part 9, the longitudinal direction of the wrist is an x-axis; a y-axis is rectangular to the x-axis in the x-y plane; a z-axis is normal to the x- and y-axes. The rectangular coordinates type robot with 6-directional movements may be realized by using an additional movement of the wrist as a rotation of it about a shaft rectangular to the shaft 58 by the motor 3γ.

The manner of direct teaching for the rectangular coordinates type robot will be described in detail referring to FIG. 11. As shown, the motors 3X, 3Y, 3Z, 3α, 3β and 3γ, respectively, are coupled with tachogenerators 58X, 58Y, 58Z, 58α, 58β and 58γ for sensing motor speeds, and rotary encoders 59X, 59Y, 59Z, 59α, 59β and 59γ for sensing amounts of angular displacements. Sampling circuits 72X, 72Y, 72Z, 72α, 72β and 72γ sample, respectively, analog signals representing motor speeds derived from the tachogenerators 58X, 58Y, 58Z, 58α, 58β and 58γ by a sampling signal 16. A/D converter circuits 73X, 73Y, 73Z, 73α, 73β and 73γ convert the output signals from the sampling circuits 72X to 72γ into digital signals speed signals $\dot{\theta}_X$, $\dot{\theta}_Y$, $\dot{\theta}_Z$, $\dot{\theta}_\alpha$, $\dot{\theta}_\beta$ and $\dot{\theta}_\gamma$ from the motors 3X, 3Y, 3Z, 3α, 3β, and 3γ are inputted into a control/operation means 64 of a microcomputer 4a through an interface circuit 74. Counters 75X, 75Y, 57Z, 75α, 75β and 75γ up-down count pulse signals outputted from rotary encoders 59X, 59Y, 59Z, 59α, 59β, and 59γ in accordance with the direction of the motor rotation, and stores the amounts of rotations of the motors 3X, 3Y, 3Z, 3α, 3β and 3γ, i.e. the coordinates (X, Y, Z, α, β, γ) of the present position of the finger part of the robot, in the form of a digital signal. Reference numerals 76a and 76b are interface circuits with the microcomputer circuit 4a. 78X, 78Y, 78Z, 78α, 78β and 78γ are D/A converter circuits, respectively. 2X, 2Y, 2Z, 2α, 2β and 2γ are respectively drive amplifiers for driving the motors 3X to 3γ in accordance with the output signals from the D/A converter circuits 78X to 78γ, and in a drive mode feed back the output signals outputted from the tachogenerators 58X to 58γ to effect the drive control of the motors. With such a circuit arrangement, the operation means 62 of the microcomputer 4a computes the formulae (7) to (12) to obtain $F_x$, $F_y$, $F_z$, $M_x$, $M_y$, and $M_z$. A coordinates converting means (1) 63 converts the $F_x$, $F_y$ and $F_z$ into an absolute coordinates system with the coordinates α, β and γ of a posture of the finger part read out from a latch 68 by the sampling signal derived from a signal generator 71 by using, for example, the following equation (19)

$$\begin{pmatrix} F_X \\ F_Y \\ F_Z \end{pmatrix} = \begin{pmatrix} \cos\alpha & -\sin\alpha\sin\beta & \sin\alpha\cos\beta \\ 0 & \cos\beta & \sin\beta \\ -\sin\alpha & -\cos\alpha\sin\beta & \cos\alpha\cos\beta \end{pmatrix} \begin{pmatrix} F_x \\ F_y \\ F_z \end{pmatrix} \quad (19)$$

where γ=0. The control/operation means 64 performs the following equations (20) to (25) by using $M_x$, $M_y$ and $M_z$ derived from the operation means 62, $F_X$, $F_Y$ and $F_Z$ from the coordinates converting means (1) 63 and the present motor-speed signals $\dot{\theta}_X$, $\dot{\theta}_Y$, $\dot{\theta}_Z$, $\dot{\theta}_\alpha$, $\dot{\theta}_\beta$, $\dot{\theta}_\gamma$ from an interface circuit 74 and aprovides drive speed commands to the respective motors.

$$P_X = k_{3X} \sum_{i=0}^{n} \{K_{1X}F_X(iT) - K_{2X}\dot{\theta}_X(iT)\} \quad (20)$$

$$P_Y = K_{3Y} \sum_{i=0}^{n} \{K_{1Y}F_Y(iT) - K_{2Y}\dot{\theta}_Y(iT)\} \quad (21)$$

$$P_Z = K_{3Z} \sum_{i=0}^{n} \{K_{1Z}F_Z(iT) - K_{2Z}\dot{\theta}_Z(iT)\} \quad (22)$$

$$P_\alpha = K_{3\alpha} \sum_{i=0}^{n} \{K_{1\alpha}M_x(iT) - K_{2\alpha}\dot{\theta}_\alpha(iT)\} \quad (23)$$

$$P_\beta = K_{3\beta} \sum_{i=0}^{n} \{K_{1\beta}M_y(iT) - K_{2\beta}\dot{\theta}_\beta(iT)\} \quad (24)$$

$$P_\gamma = K_{3\gamma} \sum_{i=0}^{n} \{K_{1\gamma}M_Z(iT) - K_{2\gamma}\dot{\theta}_\gamma(iT)\} \quad (25)$$

In response to the operation of a switch 57, a command derived from a drive mode generating means 65 positions the rectangular coordinates type robot at a given location. Then, the switch 57 switches a switch means 66 to a direct-teaching mode to be ready for accepting the signal from the control/operation means 64. Under this condition, the motors 3X to 3γ are driven in accordance with the drive speed control command signals $P_X$, $P_Y$, $P_Z$, $P_\alpha$, $P_\beta$, and $P_\gamma$ produced according to the force applied to a handle 1f of the force sensor 1 which is manually and directly operated. The coordinates of the finger part are detected by the counters 75X to 75γ and the data representing the coordinates are sequentially loaded into a memory 70 through the latch 68 and a processor 69 in response to the sampling signal generated by the signal generator 71. As a result, a locus of the movement of the finger part 9 is taught to the robot.

A case of the multi-joint type robot analogous to the arm of a human being will be described. In this example, a position of the fingers is moved by the motors 21, 24 and 23. A position X, Y and Z of the fingers is nonlinearly related to the rotational angles φ, ψ, and η of the motors 21, 24 and 23. The present case is more complicated than the case of the rectangular coordinates. It is assumed that one posture of the wrist may be changed by a single motor as in the case of the rectangular coordinates robot. Accordingly, it may controlled by using the computer 4 shown in FIG. 11.

Figure 14:
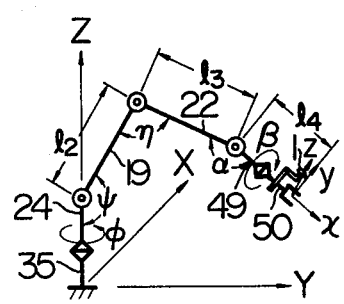
FIG. 14 is a diagram showing the fundamentals of the structure of the joint type robot with 5-directional movements.

Firstly, a target to which the wrist (the fingers) is moved is set up in the direction of a force sensed by the force sensor 1. The rotational angle of the motor corresponding to the position is calculated. Assume now that the rotational angles of the motors 21, 24 and 23 at a time point are φ(nT), ψ(nT) and η(nT). The rotational angles of the motors 21, 24 and 23 corresponding to the forces at this time point, the target values of the rotational angles of the motors 21, 24 and 23 are assumed to be $\phi(\overline{n+1}, T)$, $\psi(\overline{n+1}, T)$ and $\eta(\overline{n+1}, T)$, respectively. On the assumptions, the operation formulae computed by the computer 4 are:

$$P_\phi = K_{3\phi} \sum_{i=0}^{n} [K_{1\phi}\{\phi(\overline{i+1}T) - \phi(iT)\} - K_{2\phi}\dot{\theta}_\phi(iT)] \quad (26)$$

$$P_\psi = K_{3\psi} \sum_{i=0}^{n} [K_{1\psi}\{\psi(\overline{i+1}T) - \psi(iT)\} - K_{2\psi}\dot{\theta}_\psi(iT)] \quad (27)$$

$$P_\eta = K_{3\eta} \sum_{i=0}^{n} [K_{1\eta}\{\eta(\overline{i+1}T) - \eta(iT)\} - K_{3\eta}\dot{\theta}_\eta(iT)] \quad (28)$$

$$P_\alpha = K_{3\alpha} \sum_{i=0}^{n} [K_{1\alpha}M_x(iT) - K_{2\alpha}\dot{\theta}_\alpha(iT)] \quad (29)$$

$$P_\beta = K_{3\beta} \sum_{i=0}^{n} [K_{1\beta}M_y(iT) - K_{2\beta}\dot{\theta}_\beta(iT)] \quad (30)$$

$$P_\gamma = K_{3\gamma} \sum_{i=0}^{n} [K_{1\gamma}M_z(iT) - K_{2\gamma}\dot{\theta}_\gamma(iT)] \quad (31)$$

where $P_\phi$, $P_\psi$ and $P_\eta$ are output values to the motors 21, 24 and 23, $\dot{\theta}_\phi$, $\dot{\theta}_\psi$ and $\dot{\theta}_\eta$ motor speeds of the motors 21, 24 and 23, $K_{1j}$, $K_{2j}$ and $K_{3j}$ ($j=\phi, \psi, \eta$) each constant, $P_\alpha$ an output signal to the motor (26a in the case of in FIG. 6B, for example) for rotating the wrist about the y-axis, $P_\beta$ an output to the motor (a relative angular displacement between the motors 26a and 26b in the case of FIG. 5B, for examle) for rotating the wrist about the x-axis, $P_\gamma$ an output signal to the motor (the same rotation for the motors 26a and 26b in the case of FIG. 5B, for example, and 26b in the case of FIG. 6B) for rotating the wrist about the z-axis, $K_{1j}$, $K_{2j}$ and $K_{3j}$ ($j=\alpha, \beta, \gamma$) each constant, $\dot{\theta}_j$ ($j=\alpha, \beta, \gamma$) each motor speed. A scheme of the joint type robot as mentioned above is illustrated as shown in FIG. 14. To realize the joint type robot with six-directional movements, all the designer has to do is to have the wrist so set as to rotate about a shaft normal to the axis of a cylinder 49, by the motor 26c.

The direct-teaching for the joint type robot will be described in detail referring to FIG. 13. As shown, the motors 24, 21, 23, 26a, 26b, and 26c are coupled with tachogenerators 80$\phi$, 80$\psi$, 80$\eta$, 80$\alpha$, and $\beta$ 80$\gamma$ for detecting motor speeds and 81$\phi$, 81$\psi$, 81$\eta$, 81$\alpha$, 81$\beta$, and 81$\gamma$ for detecting the amounts of angular displacements. Sampling circuits 82$\phi$, 82$\psi$, 82$\eta$, 82$\alpha$, 82$\beta$, and 82$\gamma$ sample analog signals representing motor speeds outputted from tachogenerators 80$\phi$ to 80$\gamma$ by the sampling signal 16. The A/D converter circuits 83$\phi$, 83$\psi$, 83$\eta$, 83$\alpha$, 83$\beta$, 83$\gamma$ apply angular speed signals $\dot{\theta}_\phi$, $\dot{\theta}_\psi$, $\dot{\theta}_\eta$, $\dot{\theta}_\alpha$, $\dot{\theta}_\beta$, $\dot{\theta}_\gamma$ of the sampling circuits 82$\phi$ to 82$\gamma$ to the control/operation means 85 through an interface circuit 84. Counters 86$\phi$, 86$\psi$, 86$\eta$, 86$\alpha$, 86$\beta$, 86$\gamma$ up-down count pulse signals outputted from rotary encoders 81$\phi$ to 81$\gamma$ in the directions of the motors to store the amounts of rotations of the motors 24, 21, 23, 26a, 26b and 26c, that is, the coordinates ($\phi$, $\psi$, $\eta$, $\alpha$, $\beta$, $\gamma$) of the present joint of the finger part of the robot. Numerals 87a and 87b are interface circuits with the microcomputer 4b and are D/A converter circuits. 88$\phi$, 88$\psi$, 88$\eta$, 88$\alpha$, 88$\beta$, 88$\gamma$ are drive amplifiers for dirving the motors 24, 21, 23, 26a, 26b and 26c in accordance with the outputs from the D/A converter circuits 88$\phi$ to 88$\gamma$. In the drive mode, those amplifiers provide feedback control of the speed signals outputted from the tachogenerators 88$\phi$ to 80$\gamma$.

With such an arrangement, the operation means 62 of the microcomputer 4b computes the equations (7) to (12) to obtain $F_x$, $F_y$, $F_z$, $M_x$, $M_y$ and $M_z$. A coordinates converting means (2) 89 coordinates-converts the $F_x$, $F_y$ and $F_z$ into an absolute system with the posture coordinates $\alpha$, $\beta$, $\gamma$ of the finger part read out of the latch circuit 94 in response to the sampling signal outputted from the signal generator 71 and the rotary angle of the turntable 24 by using the following equation (26)

$$\begin{pmatrix} F_x \\ F_y \\ F_z \end{pmatrix} = \begin{pmatrix} \cos\phi\cos\alpha & -\cos\phi\sin\alpha\sin\beta & \cos\phi\sin\alpha\cos\beta \\ & -\sin\phi\cos\beta & -\sin\phi\sin\beta \\ \sin\phi\cos\alpha & -\sin\phi\sin\alpha\sin\beta & \sin\phi\sin\alpha\cos\beta \\ & +\cos\alpha\cos\beta & +\cos\phi\sin\beta \\ -\sin\alpha & -\cos\alpha\sin\beta & \cos\alpha\cos\beta \end{pmatrix} \begin{pmatrix} F_x \\ F_y \\ F_z \end{pmatrix} \quad (26)$$

where $\gamma=0$. A coordinates converting means (3) 93 coordinates-converts the present posture coordinates of each arm outputted from the latch 94 into an absolute coordinates system by using the following equation (27)

$$\left.\begin{aligned} X &= l_4\cos\phi\cos\alpha + (l_3\cos\eta + l_2\sin\psi)\cos\phi \\ Y &= l_4\sin\phi\cos\alpha + (l_3\cos\eta + l_2\sin\psi)\sin\phi \\ Z &= -l_4\sin\alpha - l_3\sin\eta + l_2\cos\psi \end{aligned}\right\} \quad (27)$$

where $l_2$ is the length of the first upper arm 19, $l_3$ the length of the forearm 22, and $l_4$ the length extending from the wrist to the finger part 9. A target position extracting means 90 performs operations of the following equation (28)

$$\left.\begin{aligned} \hat{X} &= X + T \cdot F_X \\ \hat{Y} &= Y + T \cdot F_Y \\ \hat{Z} &= Z + T \cdot F_Z \\ \hat{\alpha} &= \alpha + T \cdot M_x \\ \hat{\beta} &= \beta + T \cdot M_y \\ \hat{\gamma} &= \gamma + T \cdot M_z \end{aligned}\right\} \quad (28)$$

The coordinates converting means (3) 91 performs the operation of the following equation (29)

$$\left.\begin{aligned} \phi &= \cos^{-1}\frac{\hat{X}}{\sqrt{\hat{X}^2 + \hat{Y}^2}} \\ \psi &= \cos^{-1}\frac{X_w^2 + Z_w^2 + l_3^2 - l_2^2}{2l_3\sqrt{X_w^2 + Z_w^2}} \\ &\quad -\sin^{-1}\frac{Z_w}{\sqrt{X_w^2 + Z_w^2}} \\ \eta &= \cos^{-1}\frac{X_w^2 + Z_w^2 + l_3^2 - l_2^2}{2l_3\sqrt{X_w^2 + Z_w^2}} \\ &\quad -\sin^{-1}\frac{Z_w}{\sqrt{X_w^2 + Z_w^2}} \\ X_w &= \hat{X}\cos\phi + \hat{Y}\sin\phi - l_4\cos\alpha \\ Z_w &= \hat{Z} + l_4\sin\alpha \end{aligned}\right\} \quad (29)$$

The control/operation means 85 performs the operations of the following equations (30) to (35) to produce drive speed signals of the drive motors 24, 21, 23, 26a, 26b and 26c.

$$P_\phi = K_{3\phi} \sum_{i=0}^{n} [K_{1\phi}\{\phi(\overline{i+1}T) - \phi(iT)\} - K_{2\phi}\dot\theta_\phi(iT)] \quad (30)$$

$$P_\psi = K_{3\psi} \sum_{i=0}^{n} [K_{1\psi}\{\psi(\overline{i+1}T) - \psi(iT)\} - K_{2\psi}\dot\theta_\psi(iT)] \quad (31)$$

$$P_\eta = K_{3\eta} \sum_{i=0}^{n} [K_{1\eta}\{\eta(\overline{i+1}T) - \eta(iT)\} - K_{3\eta}\dot\theta_\eta(iT)] \quad (32)$$

$$P_\alpha = K_{3\alpha} \sum_{i=0}^{n} [K_{1\alpha}M_x(iT) - K_{2\alpha}\dot\theta_\alpha(iT)] \quad (33)$$

$$P_\beta = K_{3\beta} \sum_{i=0}^{n} [K_{1\beta}M_y(iT) - K_{2\beta}\dot\theta_\beta(iT)] \quad (34)$$

$$P_\gamma = K_{3\gamma} \sum_{i=0}^{n} [K_{1\gamma}M_z(iT) - K_{2\gamma}\dot\theta_\gamma(iT)] \quad (35)$$

Thus, in response to the operation of the switch 67, a command derived from the drive mode generating means 65 positions the joint type robot at a given location. Then, the switch 67 switches the switching means 66 to the direct-teaching mode to be ready for accepting the signals from the control/operation means 85. Under this condition, the motors 24, 21, 23, 26a, 26b, and 26c are driven in accordance with the drive speed control command signals $P_\phi$, $P_\psi$, $P_\eta$, $P_\alpha$, $P_\beta$, and $P_\gamma$ produced according to a force applied to the handle 1f of the force sensor 1 which is manually and directly operated. The coordinates of the finger part is detected by the counters 86$\phi$ to 86$\gamma$ and the data representing the coordinates are sequentially loaded loaded into the memory 96, through the latch 94 and the processor 95. In this way, a locus of the movement of the finger part 9 is taught to the joint type robot.

The control systems relating to the rectangular coordinates type robot and the multi-joint type robot, as mentioned above, may also be applied for other control systems of a polar coordinates type robot and the like. In some robots, some of the three force and moment components may of course be used. It is of course allowed in some robot construction to make one component of these force components correspond to a posture of the fingers, and one component of these moment components correspond to a position of the fingers.

As described above, the load imposed by the operator for teaching the robot, when he teaches the robot, is only the force applied to the force sensor (direct teaching). This force may electrically be amplified and is remarkably smaller than the dead weight of the robot. In this respect, the work load to the operator may be considerably alleviated. Additionally, the manual and direct operation of the wrist of the robot makes the positioning of the robot fingers easy.

We claim:

1. A teaching method for directly teaching a robot its operation, comprising the steps of:

manually moving an operating portion of a force sensor attached to a wrist, that is movably coupled with a distal end of an arm of a robot that is movable in a plurality of directions, into a predetermined teaching position;

computing a plurality of speed command value signals for moving said distal end of said arm of robot in a plurality of directions, said computation converting the signal produced by said force sensor into force components in a movement of the robot's arm, subtracting moving speed component of the robot's arm from said force components converted, and integrating the result of the subtraction with time;

driving drive means on the basis of said speed command value signals computed to guide a position of said distal end of said arm; and storing guiding data, in the form of positional information detected during said driving of the drive means, in memory means.

2. A direct teaching apparatus for industrial robot having an arm movable in a plurality of directions and a wrist coupled with a distal end of said arm, said direct teaching apparatus comprising:

(a) a force sensor with a manual operation portion mounted to said wrist for sensing plural directional forces;

(b) command generating means for generating a plurality of speed command value signals, including a converting means for converting a signal generated by said force sensor into force components of the movement directions of the robot's arm or deviations of position with respect to force components of the movement direction of the robot's arm, sensing means for sensing a movement speed of the robot's arm, subtraction means for subtracting the movement speed of the arm sensed by said sensing means from the force component or deviations of position with respect to force components converted by said converting means, and integrating means for integrating the result of the subtraction by said subtraction means with time;

(c) guiding means for driving drive means for driving said arm on the basis of said command value signals derived from said command generating means to guide a position of the distal end of the robot's arm; and (d) memory means for storing guiding data containing coordinates of the distal end position of the robot's arm guided by said guiding means.

3. A direct teaching apparatus for an industrial robot having an arm movable in a plurality of directions and a wrist coupled with a distal end of said arm, said direct teaching apparatus comprising:

(a) a force sensor with a manual operation portion mounted to said wrist for sensing plural direction force signals;

(b) first command generating means including first converting means for converting the signals generated by said force sensor into force components of the movement direction of the robot's arm, first sensing means for sensing the movement speeds of the arm, and first subtraction means for subtracting the movement speeds of the arm sensed by said first sensing means from said force components converted by said first converting means and producing a plurality of first speed command value signals for moving the distal end of the arm;

(c) first guiding means for driving the drive means for driving said arm on the basis of said first speed command value signals derived from said first command generating means to guide a position of the distal end of the robot's arm; and (d) first memory means for storing as teaching information, a coordinate of the distal end position of the robot's arm guided by said first guiding means, said coordinate position being detected by a displacement detector corresponding to each coordinate movement direction of the arm.

4. A direct teaching apparatus for the industrial robot according to claim 3, wherein said first command generating means comprises first integrating means for integrating the output derived from said first subtraction means at every one of a plurality of sampling intervals, whereby a plurality of integrating signals obtained by said first integrating means is used as a plurality of first speed command value signals.

5. A direct teaching apparatus for an industrial robot having an arm movable in a plurality of directions and a wrist coupled with a distal end of said arm, said direct teaching apparatus comprising:
   (a) a force sensor with a manual operation portion mounted to said wrist for sensing plural direction force signals;
   (b) first command generating means including first converting means for converting the signals generated by said force sensor into position deviations of the movement direction of the robots between a target position determined by said force components and a present position, first sensing means for sensing the movement speeds of the arm, and first subtracting means for subtracting the movement speeds of the robot's arm sensed by said first sensing means from said position deviations converted by said first converting means and producing a plurality of first speed command value signals for moving the distal end of the arm;
   (c) first guiding means for driving the drive means for driving said arm on the basis of said first speed command value signals derived from said first command generating means to guide a position of the distal end of the robot's arm; and
   (d) first memory means for storing as teaching information a coordinate of the distal end position of the robot's arm guided by said first guiding means, said coordinate position being detected by displacement detector corresponding to each coordinate movement direction of the arm.

6. A direct teaching apparatus for the industrial robot according to claim 5, wherein said first command generating means comprises first integrating means for integrating the output derived from said first subtraction means at every one of a plurality of sampling intervals, whereby a plurality of integrating signals obtained by said first integrating means are utilized as a plurality of first speed command signals; and further comprising a second command generating means which comprises second integrating means for integrating the output derived from said second subtraction means at each of a plurality of sampling intervals, whereby a plurality of integrating signals obtained by said second integrating means are used as a plurality of second speed command value signals.

7. A direct teaching apparatus for an industrial robot according to claim 5, wherein said robot is of the articulated type robot.

8. A direct teaching apparatus for an industrial robot according to claim 6, wherein said robot is of the articulated type robot.

9. A direct teaching apparatus for an industrial robot according to claim 5, wherein said driving means comprises a plurality of motors.

10. A direct teaching apparatus for an industrial robot according to claim 6, wherein said driving means comprises a plurality of motors.

11. A direct teaching apparatus for an industrial robot according to claim 5, further comprising second command generating means including second converting means for converting the signal generated by said force sensor into moment component of a direction of a posture of the robot's wrist, second sensing means for sensing a movement speed of the robot's wrist, and second subtraction means for subtracting the movement speed of the robot's wrist sensed by said second sensing means from said moment component converted by said second converting means and producing second speed command value signal for changing a posture of the wrist, second guiding means for driving the drive means for driving said wrist on the basis of said second command value signal derived from said second command generating means to guide a posture of the wrist, second memory means for storing as teaching information a coordinate of the robot's wrist posture guided by said second guiding means, said coordinate posture being detected by a displacement detector corresponding to the wrist.

12. A direct teaching apparatus for the industrial robot according to claim 5, further comprising a second command generating means which comprises second integrating means for integrating the output derived from said second subtraction means at every one of a plurality of sampling intervals, whereby a plurality of integrating signals obtained by said second integrating means are used as a plurality of second speed command value signals.

13. A direct teaching apparatus for the industrial robot according to claim 11, wherein said second command generating means further comprises second integrated means for integrating the output derived from said second subtraction means at every one of a plurality of sampling intervals, whereby an integrating signal obtained by said second integrated means is used as a second speed command value signal.

14. A direct teaching apparatus for the industrial robot according to claim 8, wherein said second command generating means further comprises second integrating means for integrating the output derived from said first subtraction means at every one of a plurality of sampling intervals, whereby an integrating signal obtained by said second integrating means is used as a third speed command value signal.

15. A direct teaching apparatus for an industrial robot according to claim 3, further comprising second command generating means including second converting means for converting the signal generated by said force sensor into moment component of a direction of a posture of the robot's wrist, second sensing means for sensing a movement speed of the robot's wrist, and second subtraction means for subtracting the movement speed of the robot's wrist sensed by said second sensing means from said moment component converted by said second converting means and producing second speed command value signal for changing a posture of the wrist, second guiding means for driving the drive means for driving said wrist on the basis of said second command value signal derived from said second command generating means to guide a posture of the wrist, second memory means for storing as teaching information a coordinate of the robot's wrist posture guided by said second guiding means, said coordinate posture being detected by a displacement detector corresponding to the wrist.

* * * * *